(12) United States Patent
Ryu et al.

(10) Patent No.: US 8,667,168 B2
(45) Date of Patent: Mar. 4, 2014

(54) PROXIMITY CONTROL METHOD FOR TRANSMITTING CONTENT AND NODE IN NETWORK USING THE PROXIMITY CONTROL METHOD

(75) Inventors: Hyun-Surk Ryu, Yongin-si (KR); Geoffrey M. Garner, Yongin-si (KR); Cornelis Johannis Den Hollander, Yongin-si (KR); Fei Fei Feng, Yongin-si (KR); Hong-Kyu Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1197 days.

(21) Appl. No.: 11/878,171

(22) Filed: Jul. 20, 2007

(65) Prior Publication Data
US 2008/0126561 A1 May 29, 2008

(30) Foreign Application Priority Data
Nov. 29, 2006 (KR) .................. 10-2006-0119088

(51) Int. Cl.
*G06F 15/16* (2006.01)
(52) U.S. Cl.
USPC ..................... 709/234; 709/218; 370/229
(58) Field of Classification Search
USPC .................. 709/218, 234, 233; 370/229, 231
See application file for complete search history.

(56) References Cited

U.S. PATENT DOCUMENTS

| | | | |
|---|---|---|---|
| 5,546,542 A * | 8/1996 | Cosares et al. ............. | 709/241 |
| 7,730,184 B2 * | 6/2010 | Camp, Jr. .................. | 709/226 |
| 2003/0145214 A1 * | 7/2003 | Saito et al. ................ | 713/189 |
| 2003/0177251 A1 * | 9/2003 | Suzuki et al. .............. | 709/229 |
| 2004/0028017 A1 * | 2/2004 | Whitehill et al. ........... | 370/338 |
| 2004/0053622 A1 * | 3/2004 | Nakakita et al. ........... | 455/450 |
| 2004/0158634 A1 * | 8/2004 | Saito et al. ................ | 709/225 |
| 2004/0213053 A1 * | 10/2004 | Kato et al. ................. | 365/200 |
| 2005/0182727 A1 * | 8/2005 | Robert et al. .............. | 705/51 |
| 2005/0233748 A1 * | 10/2005 | Robinson et al. .......... | 455/440 |
| 2005/0234735 A1 * | 10/2005 | Williams .................... | 705/1 |
| 2005/0234753 A1 | 10/2005 | Pinto et al. | |

(Continued)

FOREIGN PATENT DOCUMENTS

| | | |
|---|---|---|
| JP | 2001-144781 | 5/2001 |
| JP | 2004-080755 | 3/2004 |

(Continued)

OTHER PUBLICATIONS

Eric H.S. Ryu, Proximity Control Based on IEEE802.1AS, IEEE 802.1 Interim Meeting, York, Sep. 2006.
Japanese Office Action issued on Jan. 19, 2010, in corresponding Japanese Patent Application No. 2007-047614 (3 pages, in Japanese, no English translation).

*Primary Examiner* — Kostas Katsikis
(74) *Attorney, Agent, or Firm* — NSIP Law (57) ABSTRACT

A proximity control method for transmitting a content and a network node using the proximity control method is provided. A proximity control method for transmitting a content performs a different proximity control mechanism depending on each of a single proximity control (SPC) domain, a mixed proximity control (MPC) domain, and a network-based service domain, and each of nodes performs the different proximity control mechanism based on a physical distance from a neighboring node, the nodes being comprised in the SPC domain, the MPC domain, and the network-based service domain.

18 Claims, 7 Drawing Sheets

(56) References Cited

U.S. PATENT DOCUMENTS

| | | | |
|---|---|---|---|
| 2006/0236097 A1* | 10/2006 | Prologo et al. | 713/156 |
| 2007/0067817 A1* | 3/2007 | Hamilton et al. | 725/100 |
| 2007/0100701 A1* | 5/2007 | Boccon-Gibod et al. | 705/21 |
| 2007/0100768 A1* | 5/2007 | Boccon-Gibod et al. | 705/59 |
| 2007/0113081 A1* | 5/2007 | Camp | 713/168 |
| 2007/0250476 A1* | 10/2007 | Krasnik | 707/2 |

FOREIGN PATENT DOCUMENTS

| | | | | |
|---|---|---|---|---|
| JP | 2004-180020 | 6/2004 | | |
| JP | 2004-336618 | 11/2004 | | |
| JP | 2005-204087 | 7/2005 | | |
| WO | WO 2006030341 A1 * | 3/2006 | | H04L 29/06 |

* cited by examiner

PROXIMITY CONTROL METHOD FOR TRANSMITTING CONTENT AND NODE IN NETWORK USING THE PROXIMITY CONTROL METHOD

CROSS-REFERENCE TO RELATED APPLICATIONS

This application claims the benefit under 35 U.S.C. §119(a) of a Korean Patent Application No. 10-2006-0119088, filed on Nov. 29, 2006, in the Korean Intellectual Property Office, the entire disclosure of which is hereby incorporated by reference.

BACKGROUND OF THE INVENTION

1. Field of the Invention

The present invention relates to a proximity control method for transmitting a content and a network node using the proximity control method. More particularly, the present invention relates to a proximity control method which can perform improved Digital Rights management (DRM) by accurately measuring an end-to-end distance when transmitting a content, and a network node using the proximity control method.

2. Description of Related Art

Digital Rights Management (DRM) indicates a technology and a service capable of preventing an unauthorized utilization of digital contents and thereby protecting rights and benefits of a content provider. Specifically, DRM corresponds to a technology which can securely protect the content provider's rights and benefits, prevent an illegal copy, and also can support generation, distribution, and management of content, such as a fee charge, a payment as a proxy, and the like.

Also, DRM includes DRM technology which allows only an authorized user who has paid a fee to use content, software and security technology to authenticate and execute copyrights, payment technology, and the like. DRM was adopted by Napster, a music sharing service provider, for MP3 copyright protection in 2001. DRM has been appearing as a very important technology since online contents were provided for charge, and thus DRM was selected as one of ten future key information technologies by Massachusetts Institute of Technology.

Figure 1:
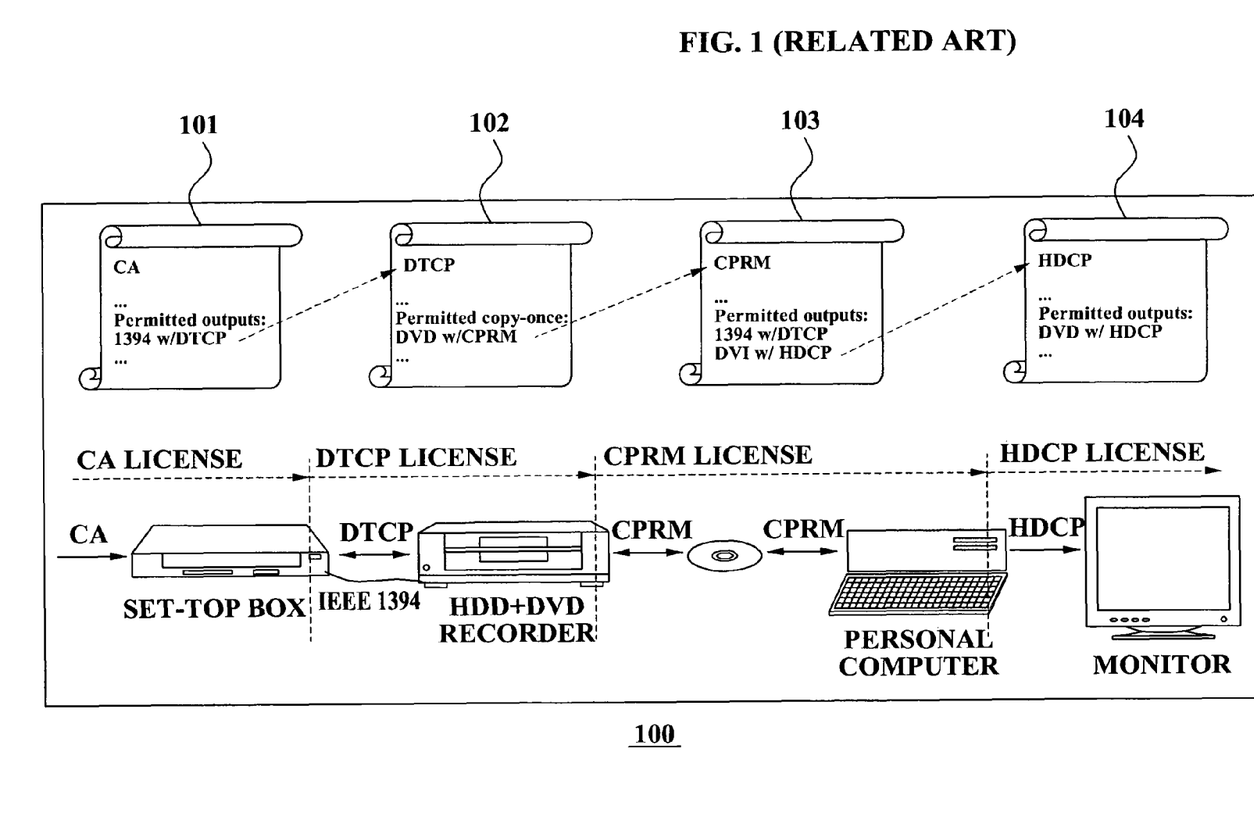
FIG. 1 illustrates an example of DRM technology in a home network according to a related art.

FIG. 1 illustrates an example of a DRM technology in a home network according to a related art.

FIG. 1 illustrates devices 100 which are utilized in the home network, and a different copy prevention mechanism which is utilized in each of the devices. Specifically, the devices include different copy prevention mechanisms respectively, such as a Certificate Authority (CA) 101, a Digital Transmission Content Protection (DTCP) 102, a Content Protection for Removable Media (CPRM) 103, and a High-bandwidth Digital Copy Protection (HDCP) 104, and the like. Therefore, another configuration is required to help interaction between the different copy prevention mechanisms, and thus costs may be increased.

Suggestions using a round-trip time (RTT) mechanism have been made to solve the above-described problems of the DRM technology, however, the suggestions were insufficient and insecure for privacy and content protection.

For example, a DTCP of Internet Protocol (IP) is required to be limited to 7 milliseconds (ms) for an end-to-end latency time, and 3 hops for the RTT method. An electrical signal may travel at least 100 m/ms and thus a limit of 7 ms may generate an error after a distance of only hundreds of kilometers. Also, whether the hop limit is maintained may be known by a hop count, however, the hop count may not provide information concerning a substantial distance of a link between a server and a receiver. Specifically, an end-to-end distance may not be accurately measured in a network.

The above-described problems may occur in a home network using an Audio/Video Bridge (AVB). The AVB provides a streaming service with less latency in an Institute of Electrical and Electronics Engineers 802 (IEEE802) network using time-synchronization. Also, in the IEEE802 network, a mechanism to accurately measure an end-to-end distance does not exist and DRM of content, which is provided via the streaming service, may not be performed. Accordingly, there is a need for a proximity control method for transmitting content to devices within a selected distance.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a proximity control method of transmitting content and a network node using the proximity control method.

An aspect of exemplary embodiments of the present invention is to perform a proximity control in a home network based on an IEEE802.1AS standard to transmit content.

Another aspect of exemplary embodiments of the present invention is to accurately measure a physical distance between neighboring nodes in the home network and check a proximity validity between the neighboring nodes by using the measured physical distance.

Another aspect of exemplary embodiments of the present invention is to transmit content via a link between nodes checked with the proximity validity only with respect to a valid distance and thereby perform DRM with respect to the content.

According to an aspect of exemplary embodiments of the present invention, a proximity control method for transmitting a content performs a different proximity control mechanism depending on each of a single proximity control (SPC) domain, a mixed proximity control (MPC) domain, and a network-based service domain, and each of nodes performs the different proximity control mechanism based on a physical distance from a neighboring node, the nodes being comprised in the SPC domain, the MPC domain, and the network-based service domain.

In an exemplary implementation of the present invention, the SPC domain may include a domain enabling a logical point-to-point connection between a source node transmitting the content and a destination node receiving the content. Also, the SPC domain may include a relay node, and the relay node may function as a switched network in the SPC domain. Also, the relay node may include an IEEE802 AVB, and the IEEE802 AVB may include a second Digital Transmission Content Protection (DTCP) which utilizes a first DTCP comprised in an Internet Protocol (IP) as an initial reference model.

In an exemplary implementation of the present invention, the SPC domain may include a distance measurement scheme about a common link to check a proximity validity between configuration elements, and the proximity control mechanism within the SPC domain may include a physical distance as a proximity parameter. The physical distance is measured by using the distance measurement scheme.

In an exemplary implementation of the present invention, the MPC domain may include a proximity control mechanism, which is used in the SPC domain, and an additional proximity control mechanism. Also, the additional proximity control mechanism may include an edge node between a relay node of the SPC domain and a destination node of the content, and the edge node may perform the additional proximity control mechanism between the relay node and the destination node.

According to another aspect of exemplary embodiments of the present invention, a node comprised in a home network includes a proximity validity checker for checking a proximity validity with either a previous node or a subsequent node that exists in a link to receive a content. In an exemplary implementation of the present invention, the proximity validity checker may check the validity proximity by utilizing a physical distance as a proximity parameter. The physical distance is measured by using a predetermined distance measurement scheme.

Other aspects, advantages, and salient features of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A home network indicates a system which connects and controls all home appliances installed in a house. In an exemplary implementation, home appliances, such as a home personal computer (PC), a home theater, a digital television (DTV), and the like, may connect with each other via various types of relay devices in the home network.

Also, the home network may connect with an external network using a set-top box. The set-top box may indicate a home communication terminal that is required to utilize a next generation bi-directional multimedia communication service, that may be an interactive television, such as a video on demand (VOD) service, an image type home shopping service, a network game service, and the like. In an exemplary implementation, the set-top box indicates a box which is placed on a television set and utilized.

The set-top box connects with a bi-directional TV or an image transmission service network of a telephone company, for example, a video phone that is provided by an American telephone company that connects with a TV monitor and the like at home. The set-top box communicates with a video server and the like that is installed in a telephone company or a cable TV provider, and also includes a basic function of receiving and converting an image signal. Also, various types of standards of the set-top box are being discussed to have a telephone interface or an access interface with a PC in order to simultaneously utilize data communication services such as a telephone, a PC communication, and the like.

The home network may connect the home appliances with each other, and receive and utilize content from an external network via the set-top box. In an exemplary implementation, a content provider (CP) may require Digital Rights Management (DRM) with respect to the content and thus the content may be controlled to transmit only within the home network. Therefore, a proximity control method according to a physical distance between nodes included in the entire network may be utilized in the entire network.

Figure 2:
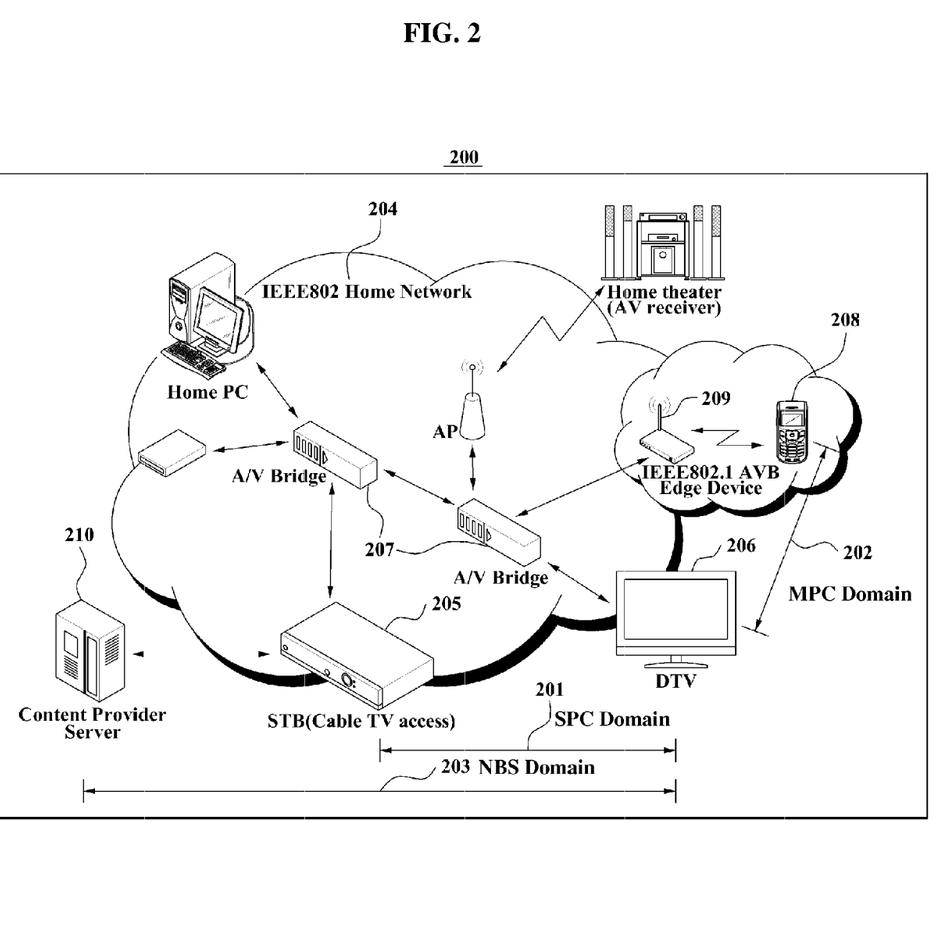
FIG. 2 illustrates a proximity control method according to an exemplary embodiment of the present invention.

FIG. 2 illustrates a proximity control method according to an exemplary embodiment of the present invention.

Hereinafter, a node may be referred to as either a "source node" or "destination node" depending on the node's function.

In the network 200, the proximity control method for transmitting content performs a different proximity control mechanism according to each of a single proximity control (SPC) domain 201, a mixed proximity control (MPC) domain 202, and a network-based service domain 203. Each of nodes performs the different proximity control mechanism based on a physical distance from a neighboring node. The nodes are comprised in the SPC domain 201, the MPC domain 202, and the network-based service domain 203.

As shown in FIG. 2, the SPC domain 201 may indicate a domain that includes a SPC mechanism in a home network 204 based on an Institute of Electrical and Electronics Engineers (IEEE) 802 standard. In an exemplary implementation of the present invention, the SPC domain 201 may include a domain enabling a logical point-to-point connection between a source node 205 transmitting the content and a destination node 206 receiving the content. Also, the SPC domain 201 may include a distance measurement scheme about a common link to check a proximity validity between configuration elements.

In an exemplary implementation of the present invention, the source node 205 may include home appliances, which connect with each other via the home network 204, or may include a set-top box to connect with an external network.

Also, the proximity control mechanism within the SPC domain 201 may include a physical distance, which is measured by using the distance measurement scheme, as a proximity parameter. An accurate location measurement function may be provided for a Digital Transmission Content Protection (DTCP) based on an IEEE802.1AS standard.

The SPC domain 201 may include a relay node 207, and the relay node 207 may function as a switched network in the SPC domain 201.

The relay node 207 may include an IEEE802 Audio/Video Bridge (AVB), and the IEEE802 AVB may include a second DTCP which utilizes a first DTCP included in an Internet Protocol (IP) as an initial reference model. Also, when the second DTCP has a proximity probability to a layer 2 (L2), the second DTCP includes an IEEE802.1x standard in any one of domains of the second DTCP.

Figure 3:
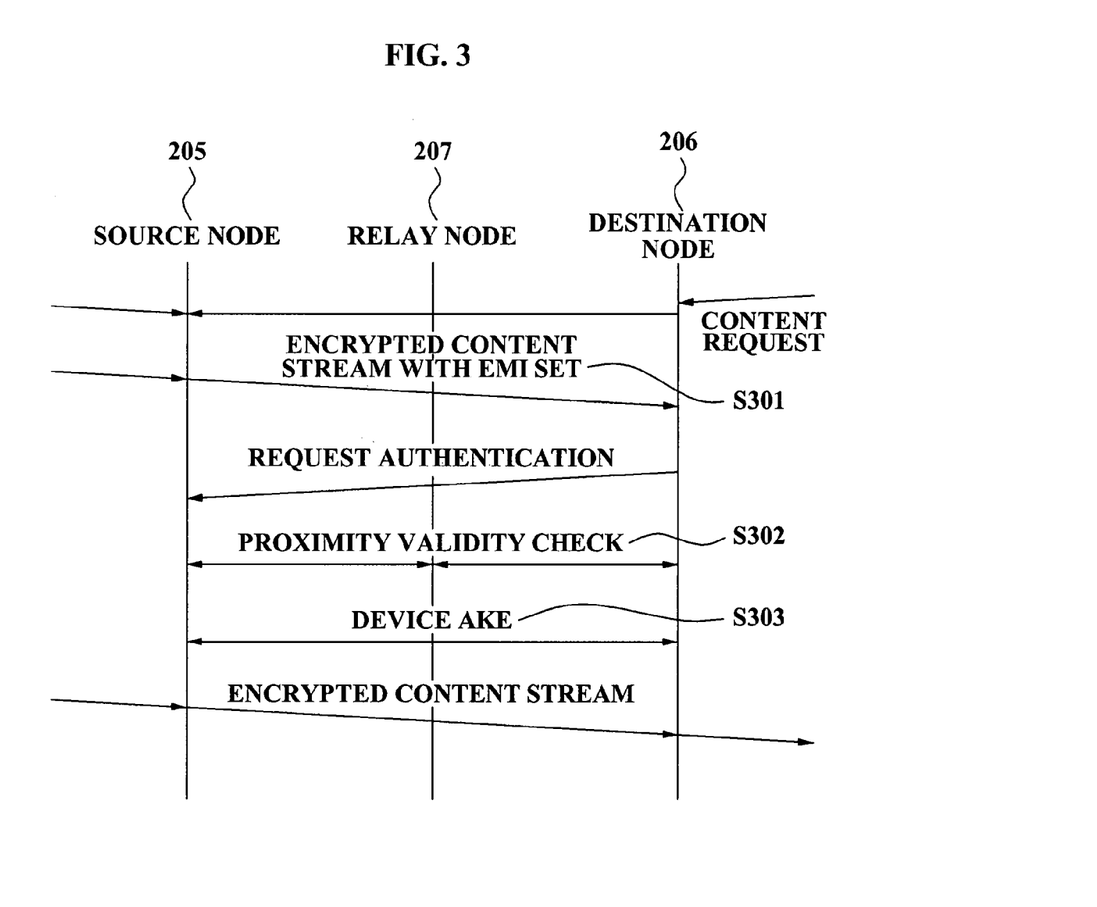
FIG. 3 illustrates an example of a proximity control method in a single proximity control (SPC) domain according to an exemplary embodiment of the present invention.

FIG. 3 illustrates an example of a proximity control method in an SPC domain according to an exemplary embodiment of the present invention.

In step S301, a source node 205 transmits an encrypted content stream with an encrypted mode indicator (EMI) set to a destination node 206 according to a content request of the destination node 206. In an exemplary implementation, when the source node 205 corresponds to a home appliance connected via the home network 204, the encrypted content stream may be generated based on content included in the home appliance. Also, when the source node 205 corresponds to the set-top box, the encrypted content stream may be transmitted from the external network to the home network 204.

In step S302, the source node 205 checks a proximity validity with respect to an authentication request of the destination node 206 which receives the encrypted content stream. In an exemplary implementation, the source node 205 may check the proximity validity with the relay node 207 to authenticate the destination node 206, and the relay node 207 may check the proximity validity with the destination node 206. The proximity validity between neighboring nodes in a link to transmit the content may be checked.

As described above, the proximity validity may be checked by using a DTCP that is included in IEEE802 AVB. Also, IEEE802 AVB may include a proximity control mechanism which utilizes a physical distance between the neighboring nodes as a proximity parameter. The physical distance is measured by using a distance measurement scheme. For example, an IEEE802.1AS standard, an IEEE802.11v standard, an IEEE802.11k standard, an IEEE802.xx standard, and the like have an identical function to measure the physical distance.

An IEEE802 technology including an accurate time-synchronization feature may successfully transmit content between two ends corresponding to a boundary of a service domain even when an accurate distance is not known. Currently, the distance may be within about 30 feet of a target value via verification using a hardware prototype test.

In step S303, the source node 205 transmits an indicator of a device authentication and key exchange (AKE) to the destination node 206 via the link checked with the proximity validity. Also, the source node 205 transmits the encrypted content stream without the EMI set to the destination node 206 that is authenticated via the device AKE. The destination node 206 may be authenticated and may decrypt the encrypted content stream via the device AKE.

The MPC domain 202 may include a proximity control mechanism, which is used in the SPC domain 201, and an additional proximity control mechanism. The additional proximity control mechanism may include an edge node 209 to connect the relay node 207, which is included in the SPC domain 201, with the destination node 208, such as a mobile terminal, and the like, which is excluded in the home network 204. The edge node 209 may perform the additional proximity control mechanism between the relay node 207 and the destination node 208.

The additional proximity control mechanism may be conditionally expandable in a Digital Living Network Alliance (DLNA). The DLNA, as a new official cooperation which leads a world home network commercialization, changed from Digital Home Working Group (DHWG) which was started in June of 2003 and was newly launched.

The additional proximity control mechanism has an aim to construct an interactive platform based on a constructed public business standard and realize a convergence between industries. Therefore, the additional proximity control mechanism may encourage introduction of guidelines based on an IP, Hypertext Transport Protocol, UNIVERSAL PLUG AND PLAY® (UPNP®), which allows peer-to-peer networking of various devices, WIRELESS-FIDELITY® (WI-FI®), which includes networks and devices that allow devices to connect to the Internet when within range of a wireless network connected to the Internet, and the like, which are widely utilized in manufacturers of home appliances, PCs, and wireless devices. Products designed according to the DLNA guideline may readily share media contents, such as music, photos, videos, and the like via a home network.

The additional proximity control mechanism may include a proximity control mechanism using any one of an IEEE1394 standard, a wireless IEEE1394 standard, BLUETOOTH®, which is a wireless communications protocol, a Universal Serial Bus (USB), a wireless USB, and the like. Also, the additional proximity control mechanism may be included in the proximity control mechanism that is utilized in the SPC 201, and also may utilize the SPC domain 201 as the MPC domain 202.

Figure 4:
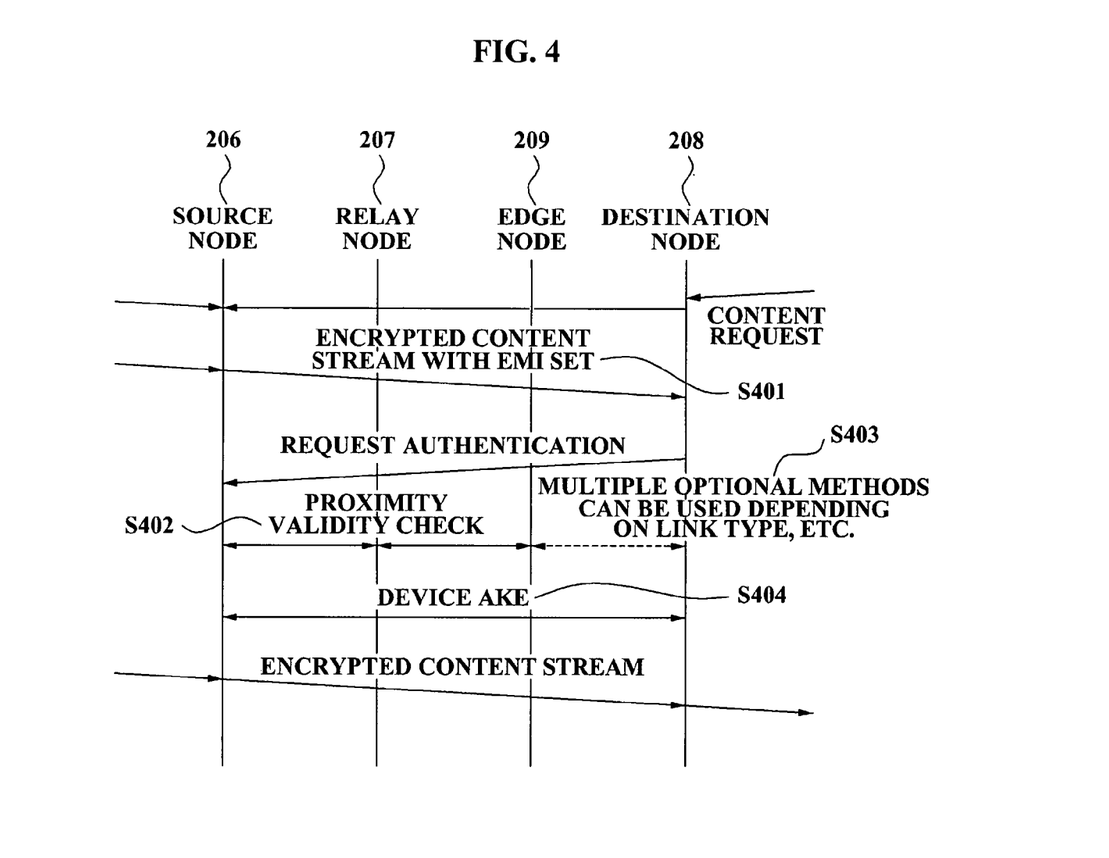
FIG. 4 illustrates an example of a proximity control method in a mixed proximity control (MPC) domain according to an exemplary embodiment of the present invention.

FIG. 4 illustrates an example of a proximity control method in an MPC domain.

In step S401, a source node 206, which transmits content, transmits an encrypted content stream with an EMI set to a destination node 208 according to a content request of the destination node 208. In an exemplary implementation, when the source node 206 corresponds to a home appliance connected via the home network 204, the encrypted content stream may be generated based on content included in the home appliance. Also, when the source node 206 corresponds to the set-top box, the encrypted content stream may be transmitted from the external network to the home network 204.

In step S402, the source node 206 checks a proximity validity with respect to an authentication request of the destination node 208 which receives the encrypted content stream. In an exemplary implementation, the source node 206 may check the proximity validity with the relay node 207 to authenticate the destination node 208, and the relay node 207 may check the proximity validity with the edge node 209 which performs an additional proximity control mechanism In step S403, edge node 209 may check the proximity validity with the destination node 208. In an exemplary implementation, the destination node 208 and the edge node 209 may connect with each other using various types of methods, such as an IEEE1394 standard, a wireless IEEE1394 standard, BLUETOOTH®, a USB, a wireless USB, and the like. The proximity validity may be checked using any one of the various types of methods according to a link type.

As described above, in step S402 and S403, the proximity validity between neighboring nodes in a link to transmit the content may be checked.

In step S404, the source node 206 transmits an indicator of a device authentication and key exchange (AKE) to the destination node 208 via the link checked with the proximity validity. Also, the source node 208 transmits the encrypted content stream without the EMI set to the destination node 208 that is authenticated via the device AKE. The destination node 208 may be authenticated and may decrypt the encrypted content stream via the device AKE.

As described above, the proximity validity may be checked using a DTCP that is included in IEEE802 AVB. Also, IEEE802 AVB may include a proximity control mechanism which utilizes a physical distance between the neighboring nodes as a proximity parameter. The physical distance is measured by using a distance measurement scheme. For example, an IEEE802.1AS standard, an IEEE802.11v standard, an IEEE802.11k standard, an IEEE802.xx standard, and the like, have an identical function to measure the physical distance.

An IEEE802 technology including an accurate time-synchronization feature may successfully transmit content between two ends corresponding to a boundary of a service domain even when an accurate distance is not known. Currently, the distance may be within about 30 feet of a target value via verification using a hardware prototype test.

The network-based service domain 203 may include a relay control node 205 for a proximity control, and the relay control node 205 may be authenticated by a CP node 210. In an exemplary implementation, the relay control node 205 may include the set-top box which relays a link between the CP node 210 and a home network including a destination node of the content.

Specifically, the relay control node 205 may correspond to the source node 205 in the SPC domain 201 and the MPC domain 202. Therefore, the network-based service domain 203 may further include the SPC domain 201, the MPC domain 202, or a combination thereof.

Figure 5:
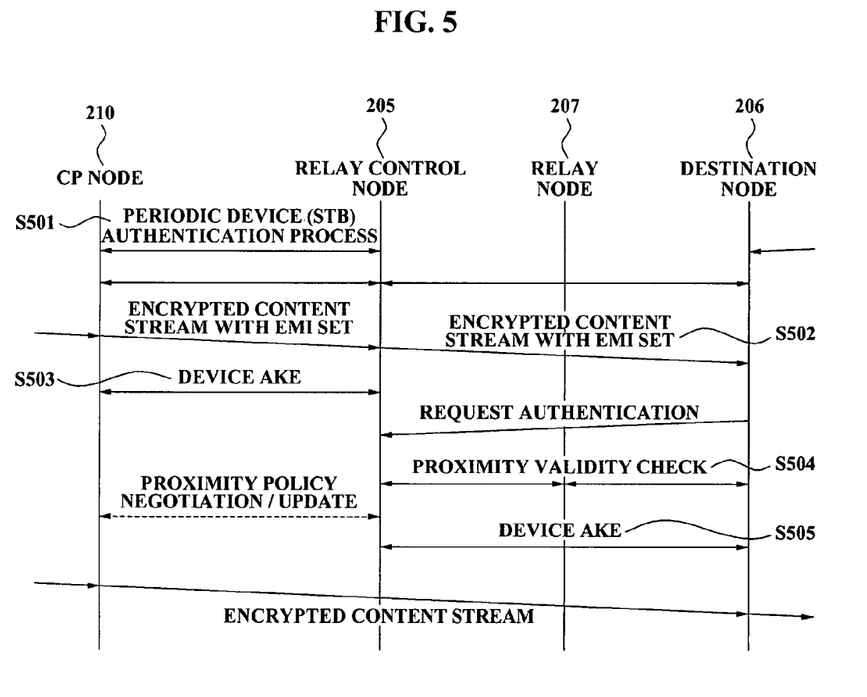
FIG. 5 illustrates an example of a proximity control method in a network-based service domain according to an exemplary embodiment of the present invention.

FIG. 5 illustrates an example of a proximity control method in a network-based service domain.

In step S501, a CP node 210 performs an authentication process with a relay control node 205. In an exemplary implementation, a link distance between the relay control node 205 and the CP node 210 is not required to be measured. The proximity control may be performed by authenticating the relay control node 205 via an authentication method that is provided from the CP node 210.

In step S502, the CP node 210 transmits an encrypted content stream with an EMI set to a destination node 206 or 208 according to a content request of the destination node 206. In an exemplary implementation, the relay control node 205 may function as a relay which receives the encrypted content stream from the external network and transfers the received encrypted content stream to the home network 204.

In step S503, the CP node 210 transmits a device AKE to the relay control node 205. The device AKE may be transmitted to the destination node 206 or 208, and thus, when the proximity validity about a link in the home network 204 is checked, the device AKE may be transmitted from the relay control node 205 to the destination node 206 or 208.

In step S504, when the network-based service domain 203 includes the SPC domain 201, such as when the network-based service domain 203 includes the destination node 206, the relay control node 205 checks the proximity validity with the relay node 207, and the relay node 207 checks the proximity validity with the destination node 206.

Also, when the network-based service domain 203 includes the MPC domain 202, such as when the network-based service domain 203 includes the destination node 208, the relay control node 205 may check the proximity validity with the relay node 207, and the relay node 207 may check the proximity validity with the edge node 209, which performs an additional proximity control mechanism. Also, the edge node 209 may check the proximity validity with the destination node 208 by using the additional proximity control mechanism.

As described above, the proximity validity may be checked by using a DTCP that is included in IEEE802 AVB. In an exemplary implementation of the present invention, IEEE802 AVB may include a proximity control mechanism which utilizes a physical distance between the neighboring nodes as a proximity parameter. The physical distance is measured by using a distance measurement scheme. For example, an IEEE802.1AS standard, an IEEE802.11v standard, an IEEE802.11k standard, an IEEE802.xx standard, and the like have an identical function to measure the physical distance.

In step S505, the relay control node 205 transmits the device AKE received from the CP node 210 to the destination node 206 or 208 via the link checked with the proximity validity. The destination node 206 or 208 may be authenticated via the device AKE and may decrypt the encrypted content stream via the device AKE.

As described above, a proximity control method according to an exemplary implementation of the present invention may perform a proximity control in a home network based on an IEEE802.1AS standard to transmit content. Also, the proximity control method may accurately measure a physical distance between neighboring nodes in the home network and check a proximity validity between the neighboring nodes by using the physical distance.

Also, a proximity control method according to an exemplary implementation of the present invention may transmit content via a link between nodes checked with the proximity validity only with respect to a valid distance and thereby perform DRM with respect to the content.

Figure 6:
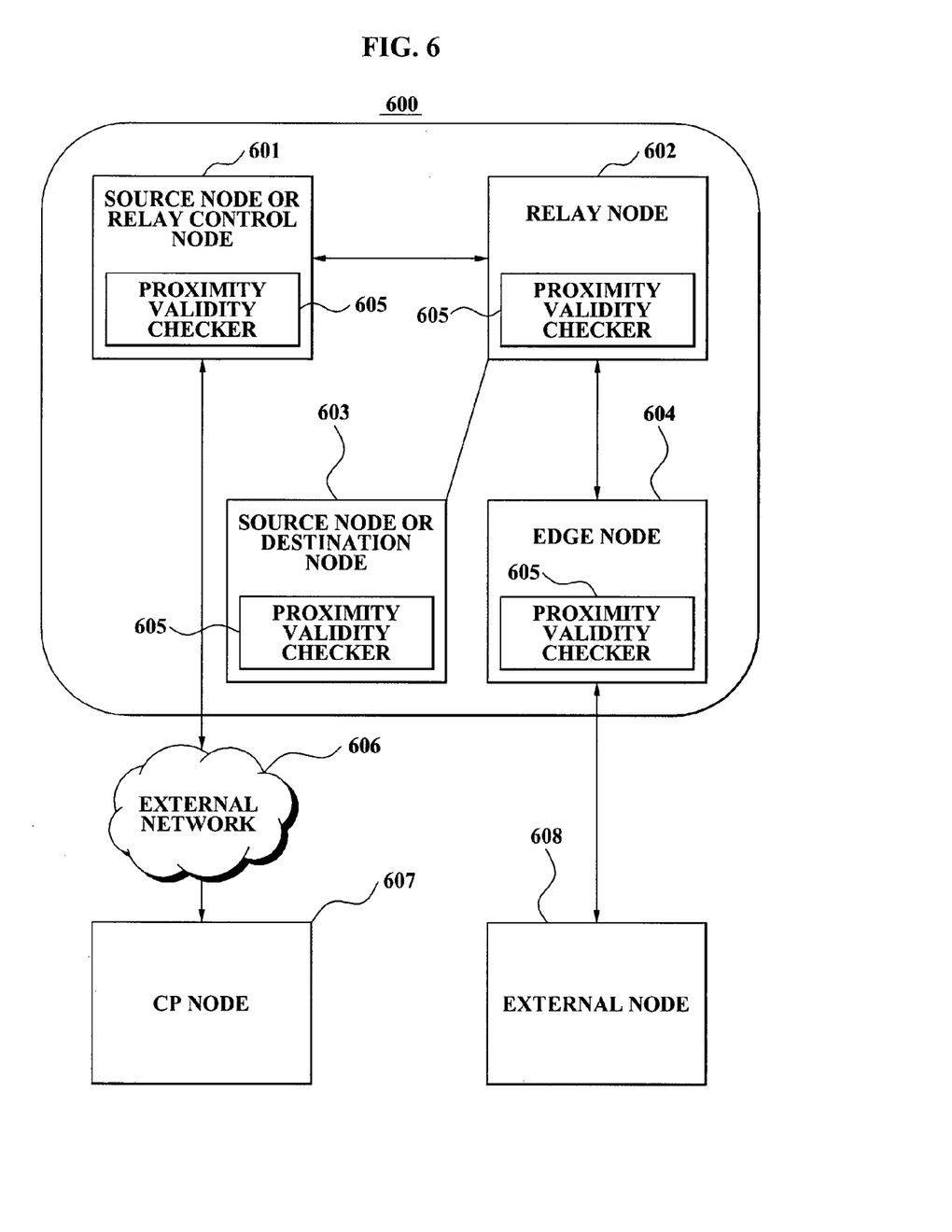
FIG. 6 illustrates a node included in a home network according to another exemplary embodiment of the present invention.

FIG. 6 illustrates a node included in a home network according to another exemplary embodiment of the present invention.

In a home network 600, each of nodes 601, 602, and 603, which are included in the home network 600, includes a proximity validity checker 605 for checking a proximity validity with either a previous node or a subsequent node that exists in a link to receive a content.

In an exemplary implementation of the present invention, the proximity validity checker 605 may check the validity proximity by utilizing a physical distance, which is measured by using a predetermined distance measurement scheme, as a proximity parameter. The distance measurement scheme may utilize a second DTCP which utilizes a first DTCP included in an IP as an initial reference model.

For example, the node 602 may check the proximity validity with another node 601, 603, or 604 by using the physical distance with the other node 601, 603, or 604, which is measured via the distance measurement scheme, as a proximity parameter.

In an exemplary implementation of the present invention, each of nodes 601 through 604 may correspond to an edge node including any one of 1) a home appliance connecting with the home network 600, 2) a relay control node including a set-top box, 3) a relay node including an IEEE802 AVB, and 4) a mechanism associated with any one of an IEEE1394 standard, a wireless IEEE1394 standard, BLUETOOTH®, a USB, a wireless USB, and the like.

As shown in FIG. 6, when the node 603 corresponds to the home appliance, the node 603 may correspond to any one of a source node transmitting content in the home network 600 and a destination node receiving the content in the home network 600.

In an exemplary implementation of the present invention, when the node 601 corresponds to the relay control node, the node 601 may function as a relay which performs a proximity control between the home network 600 and an external network 606. Also, the proximity validity of the relay control node may be checked by a CP node 607 which transmits the content via the external network 606. Also, the proximity validity may utilize an authentication method provided from the CP node 607, without using a distance between the CP node 607 and the relay control node.

In an exemplary implementation of the present invention, when the node 602 corresponds to the relay node, the node 602 may function as a switched network in an SPC domain which enables a logical point-to-point connection between a source node transmitting content and a destination node receiving the content. For example, the node 602 corresponding to the relay node may function as the switched network to transmit the content between the source node 601 and the destination node 603.

In an exemplary implementation of the present invention, when the node 604 corresponds to the edge node to connect with an external node 608, such as a mobile communication terminal, which is excluded in the home network 600, and the like, the node 604 may perform an additional control mechanism between the relay node 602 and the external node 608.

The additional proximity control mechanism may be conditionally expandable in a DLNA. Also, the additional proximity control mechanism may include a proximity control mechanism using any one of an IEEE1394 standard, a wireless IEEE1394 standard, BLUETOOTH®, a USB, a wireless USB, and the like.

As described above, according to an exemplary implementation of the present invention, it is possible to perform a proximity control in a home network based on an IEEE802.1AS standard to transmit content via each of nodes included in the home network. Also, it is possible to accurately measure a physical distance between neighboring nodes in the home network and check a proximity validity between the neighboring nodes by using the physical distance.

Also, according to an exemplary implementation of the present invention, it is possible to transmit content via a link between nodes checked with the proximity validity only with respect to a valid distance and thereby perform DRM with respect to the content.

Figure 7:
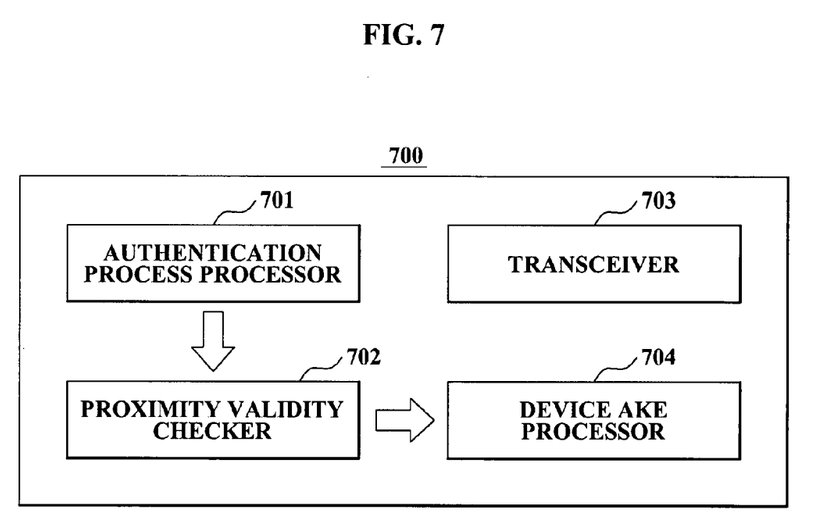
FIG. 7 illustrates an internal configuration of a relay control node controlling a relay between a CP node and a home network according to still another aspect of the present invention.

FIG. 7 illustrates an internal configuration of a relay control node controlling a relay between a CP node and a home network according to still another exemplary aspect of the present invention. As shown in FIG. 7, a relay control node 700 includes an authentication process processor 701, a proximity validity checker 702, a transceiver 703, and a device AKE processor 704.

The authentication process processor 701 performs an authentication process with a CP node that provides content. The relay control node 700, which relays data between an external network and the home network, checks a proximity validity by using a physical distance between the relay control node 700 and another node to authenticate the other node in the home network. Also, for authentication with the CP node, the relay control node is authenticated by using the authentication process that is provided from the CP node. When using the authentication process, the physical distance between the CP node and the relay control node 700 is not measured.

The proximity validity checker 702 checks a proximity validity with a subsequent node that exists in a link to receive the content. In an exemplary implementation, the proximity validity checker 702 may check the validity proximity by utilizing a physical distance, which is measured by using a predetermined distance measurement scheme, as a proximity parameter. The distance measurement scheme may utilize a second DTCP which utilizes a first DTCP included in an IP as an initial reference model.

CP node may perform DRM with respect to content desired to be transmitted by checking the proximity validity using the physical distance with each of nodes included in the home network.

The transceiver 703 receives an encrypted content stream from the CP node and transmits the encrypted content stream to a destination node of the content. In an exemplary implementation, the encrypted content stream may include an EMI set when the destination node is unauthenticated.

The device AKE processor 704 transmits a device AKE to the destination node via the link checked with the proximity validity. In an exemplary implementation, the device AKE processor 704 may transmit the device AKE to the destination node when the proximity validity between all nodes existing in the link is verified. Also, the destination node may be authenticated to receive the content via the device AKE and may acquire a key to decrypt the encrypted content stream.

In an exemplary implementation, mobile communication terminals as used in the present specification include, but are not limited to, portable devices such as a Personal Digital Cellular (PDC) phone, a personal communication service (PCS) phone, a personal handyphone system (PHS) phone, a Code Division Multiple Access (CDMA)-2000 (1×, 3×) phone, a Wideband CDMA phone, a dual band/dual mode phone, a Global Standard for Mobile Communications (GSM) phone, a mobile broadband system (MBS) phone, a Digital Multimedia Broadcasting (DMB) phone, a cellular phone, and the like; portable terminals such as a personal digital assistant (PDA), a hand-held PC, a notebook PC, a laptop computer, a wireless broadband Internet (WiBro) terminal, an MP3 player, an MD player, and the like; and all types of hand-held based wireless communication devices including an International Mobile Telecommunication (IMT)-2000 providing international roaming service and extended mobile communication service, and the like. Also, the mobile communication terminal may include a predetermined communication module such as a CDMA module, a BLUETOOTH® module, an Infrared Data Association (IrDA) module, a wired/wireless LAN card and a wireless communication device which is provided with a global positioning system (GPS) chip enabling tracking of a position via a GPS. Also, the portable device may include a microprocessor which can play multimedia and perform a certain calculation operation.

The proximity control method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The computer-readable recording medium can also be distributed over network-coupled computer systems so that the computer-readable code is stored and executed in a distributed fashion. Examples of program instructions include both machine code, such as produced by a compiler, and files containing higher level code that may be executed by the computer using an interpreter. Also, functional programs, codes, and code segments for accomplishing the present invention can be easily construed as within the scope of the invention by programmers skilled in the art to which the present invention pertains. The described hardware devices may be configured to act as one or more software modules in order to perform the operations of the above-described exemplary embodiments of the present invention.

According to exemplary embodiments of the present invention, it is possible to perform a proximity control in a home network based on an IEEE802.1AS standard to transmit content.

Also, according to exemplary embodiments of the present invention, it is possible to accurately measure a physical distance between neighboring nodes in the home network and check a proximity validity between the neighboring nodes by using the measured physical distance.

Also, according to exemplary embodiments of the present invention, it is possible to transmit content via a link between nodes checked with the proximity validity only with respect to a valid distance and thereby perform DRM with respect to the content.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A proximity control method for transmitting content from a source node to a destination node, the method comprising:
    receiving or relaying a content request from the destination node; and
    performing, at each node in a link from the source node to the destination node, a proximity control mechanism based on whether the transmitting is in a single proximity control (SPC) domain, a mixed proximity control (MPC) domain, or a network-based service domain, and based on a physical distance with respect to a neighboring node, wherein
    the SPC domain comprises a relay node,
    the relay node functions as a switched network in the SPC domain and the relay node comprises an Audio/Video Bridge (AVB), and the AVB comprises a second Digital Transmission Content Protection (DTCP) which utilizes a first Digital Transmission Content Protection (DTCP) as an initial reference model, and an Internet Protocol (IP) comprises the first Digital Transmission Content Protection (DTCP), and
    the second Digital Transmission Content Protection (DTCP) comprises a standard carrying out wireless local area network communication in any one of domains of the second Digital Transmission Content Protection (DTCP) when the second Digital Transmission Content Protection (DTCP) has a proximity probability to a layer 2 (L2).

2. The method of claim 1, wherein the SPC domain comprises a domain enabling a logical point-to-point connection between a node transmitting the content and a node receiving the content.

3. The method of claim 2, wherein the SPC domain comprises a distance measurement scheme about a common link to check a proximity validity between configuration elements, and a proximity control mechanism within the SPC domain comprises a physical distance as a proximity parameter, the physical distance being measured using the distance measurement scheme.

4. The method of claim 1, wherein the network-based service domain comprises a relay control node for a proximity control, and the relay control node is authenticated by a content provider (CP) node transmitting the content.

5. The method of claim 4, wherein the network-based service domain further comprises at least one of the SPC domain and the MSC domain.

6. The method of claim 4, wherein the relay control node comprises a set-top box which relays a link between the CP node and a home network comprising a destination node of the content.

7. The method of claim 1, wherein the MPC domain comprises a proximity control mechanism for the SPC domain, and an additional proximity control mechanism.

8. The method of claim 7, wherein the additional proximity control mechanism comprises an edge node between a relay node of the SPC domain and a destination node of the content, and the edge node performs the additional proximity control mechanism between the relay node and the destination node.

9. The method of claim 7, wherein the additional proximity control mechanism comprises a proximity control mechanism using any one of a serial bus interface standard, a wireless serial bus interface standard, Bluetooth, a Universal Serial Bus (USB), or a wireless USB.

10. A network comprising:
    a plurality of nodes on a link, each node including a proximity validity checker processor configured to check proximity validity with either a previous node of the plurality of nodes or a subsequent node of the plurality of nodes in a link to receive a content, wherein
    the proximity validity checker processor is configured to perform the proximity validity checking based on whether the node is in a single proximity control (SPC) domain, a mixed proximity control (MPC) domain, or a network-based service domain, and based on a physical distance with respect to a neighboring node,
    the proximity validity checker checks the proximity validity by utilizing a physical distance as a proximity parameter, the physical distance being measured by using a distance measurement scheme, and
    the distance measurement scheme comprises a second Digital Transmission Content Protection (DTCP) which utilizes a first Digital Transmission Content Protection (DTCP) as an initial reference model, and an Internet Protocol (IP) comprises the first Digital Transmission Content Protection (DTCP).

11. The network of claim 10, wherein the network is a home network.

12. The network of claim 10, wherein at least one of the plurality of nodes comprises the proximity validity checker processor.

13. A non-transitory computer-readable recording medium storing a program for implementing the method of claim 1.

14. A plurality of nodes on a link configurable in a home network, each node comprising:
    a proximity validity checker processor configured to check proximity validity with either a previous node or a subsequent node in a link to receive a content, wherein
    the proximity validity checker processor is configured to perform the proximity validity checking based on whether the node is in a single proximity control (SPC) domain, a mixed proximity control (MPC) domain, or a network-based service domain, and based on a physical distance with respect to a neighboring node, the proximity validity checker processor checks the proximity validity by utilizing a physical distance as a proximity parameter, the physical distance being measured by using a distance measurement scheme, and the distance measurement scheme comprises a second Digital Transmission Content Protection (DTCP) which utilizes a first Digital Transmission Content Protection (DTCP) as an initial reference model, and an Internet Protocol (IP) comprises the first Digital Transmission Content Protection (DTCP).

15. The plurality of nodes of claim 14, wherein the each node corresponds to an edge node comprising any one of a home appliance connecting with the home network, a relay control node comprising a set-top box, or a relay node comprising an Audio/Video Bridge (AVB), and a mechanism associated with any one of a serial bus interface standard, a wireless serial bus interface standard, Bluetooth, a Universal Serial Bus (USB), or a wireless USB.

16. A relay control node located between a Content Provider (CP) node and a home network, the relay control node comprising:
an authentication process processor for performing an authentication process with the CP node that provides content; and
a proximity validity checker for checking a proximity validity with a subsequent node in a link to receive the content, wherein the proximity validity checker is configured to perform the proximity validity checking based on whether the relay node is in a single proximity control (SPC) domain, a mixed proximity control (MPC) domain, or a network-based service domain, and based on a physical distance with respect to a neighboring node, the proximity validity checker checks the proximity validity by utilizing a physical distance as a proximity parameter, the physical distance being measured by using a distance measurement scheme, and the distance measurement scheme comprises a second Digital Transmission Content Protection (DTCP) which utilizes a first Digital Transmission Content Protection (DTCP) as an initial reference model, and an Internet Protocol (IP) comprises the first Digital Transmission Content Protection (DTCP).

17. The relay control node of claim 16, further comprising:
a transceiver for receiving an encrypted content stream from the CP node and transmitting the encrypted content stream to a destination node of the content; and
a device authentication and key exchange (AKE) processor for transmitting a device AKE to the destination node via the link checked with the proximity validity.

18. The relay control node of claim 17, wherein the device AKE processor transmits the device AKE to the destination node when the proximity validity between all nodes existing in the link is verified.

* * * * *